United States Patent Office 2,778,815
Patented Jan. 22, 1957

2,778,815

PROCESS FOR THE PRODUCTION OF AROMATIC O-HYDROXYDIAZO COMPOUNDS

Hans Ackermann, Riehen, near Basel, and Guido Schetty, Basel, Switzerland, assignors to J. R. Geigy A. G., Basel, Switzerland, a Swiss firm No Drawing. Application July 16, 1954,
Serial No. 443,963

Claims priority, application Switzerland July 20, 1953

7 Claims. (Cl. 260—141)

The present invention is concerned with the production of aromatic o-hydroxydiazo compounds which are valuable as intermediate products. In particular it is concerned with the production of aromatic diazoxides from diazonium compounds which do not give metallisable azo dyestuffs, which aromatic diazoxides are usable as intermediate products for metallisable azo dyestuffs.

5-alkylsulphonyl - 2 - amino - 1 - hydroxybenzene compounds have not been known hitherto although their diazo compounds would be valuable intermediate products for the production of metallisable azo dyestuffs. If attempts are made to produce them by the usual methods, e . g. from the known benzoxazol-2-one-6-sulphonic acid chloride by mild reduction to the corresponding sulphinic acid, alkylation thereof and then saponification to form the o-aminophenol, then only impure products in very poor yields are obtained due to unavoidable side reactions.

It has now been found that diazo compounds from 5-sulphonyl-2-amino-1-hydroxybenzene compounds can be produced in satisfactory yields and purity if mineral acid solutions of diazonium compounds of the general formula:

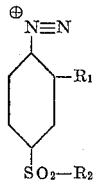

are neutralised under such suitable conditions, preferably up to a pH value of 6–11, that the substituent $R_1$ is replaced by the hydroxyl group. In this formula:

$R_1$ represents an electron-attracting substituent, preferably a nitro group, and
$R_2$ represents an organic radical, preferably a low molecular alkyl group.

Should $R_1$ not be the nitro group but, for example a halogen atom, then there must be a further substituent with a negative influence in one of the remaining positions of the benzene ring, e. g. halogen or the sulphonic acid group, the latter preferably in the 6-position, so that the exchange of the hydroxyl group is performed sufficiently quickly and completely. Those diazonium compounds are preferred however, in which $R_1$ represents the nitro group because this can be replaced particularly easily by the hydroxyl group. Corresponding diazonium compounds can also be produced particularly easily by nitrating 1-alkoxy- or 1-halogenbenzene-4-sulphones, exchanging the alkoxy group or the halogen for the amino group and diazotising. As further substituents, halogen, methyl or methoxy groups for example can be present in the 3-, 5- or 6-positions of the benzene ring.

Preferably the radical $R_2$ represents an alkyl group, e. g. the methyl, ethyl, propyl, n-butyl, chloromethyl, hydroxypropyl group, but it can also be an alkenyl group, e. g. the vinyl group, an aralkyl group, e. g. the benzyl group, or an aryl group, e. g. a phenyl or substituted phenyl group; if desired it may also be a cycloalkyl group, e. g. the cyclohexyl group. Halogen, alkyl, alkoxy, carboxyl and sulphonic acid groups for example can be substituents of the phenyl group.

The diazonium compounds usable according to the present invention can be produced in the usual manner by diazotising corresponding amines in a mineral acid medium with sodium nitrite. o-Nitraniline compounds usable according to the invention can be indirectly diazotised provided that they contain water solubilising substituents; should this not be the case, it is advantageous to diazotise them in concentrated sulphuric acid with powdered dry sodium nitrite or with nitrosyl sulphonic acid.

The neutralisation of the mineral acid which is necessary for the diazotisation in order to exchange the substituent $R_1$ for the hydroxyl group, is performed in the cold with alkali lye or with salts of weak acids which have an alkaline action, e. g. with alkali metal carbonate or with alkali metal bicarbonate. In many cases it is particularly advantageous to slowly add the diazonium compound to the amount of ice cold solution of alkali metal carbonate or bicarbonate which has been calculated to neutralise the mineral acid. As soon as the starting compound has disappeared, which can be ascertained by testing a sample with 2-hydroxynaphthalene-6.8-disulphonic acid to see if a dyestuff is formed, it is of advantage to work up the reaction solution direct by coupling to form metallisable azo dyestuffs, because in many cases it is not necessary to isolate the 5-sulphonylbenzene-2.1-diazoxides or this cannot be done or only with great loss of yield.

The relatively uncomplicated process of forming 5-alkylsulphonyl-benzene-2.1-diazoxides was certainly not obvious. In comparison with the analogous reaction of the 2.4-dinitrobenzene-1-diazonium compound, a much slower reaction was to be expected due to the much less negative influence for example of an alkyl sulphone group in 4-alkylsulphonyl-2-nitrobenzene-1-diazonium compounds. (In this respect see, for example, C. M. Suter: The Organic Chemistry of Sulfur, N. Y., Wiley & Sons Inc. 3rd edition, 1948, table on page 686.) As a result, a much worse yield of diazoxide was to be expected, due to the unavoidable further decomposition of the diazonium compounds. Most surprisingly, the yield of 5-alkylsulphonyl-benzene-2.1-diazoxides not only equals that of 5-nitrobenzene-2.1-diazoxide from 2.4-dinitrobenzene-1-diazonium compound, but in most cases, exceeds it.

The compounds produced by the method of the present invention are useful as diazo components in the preparation of metallisable azo dyestuffs.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

21.6 parts of 3-nitro-4-aminobenzene-1-methyl sulphone, in nitrosyl sulphuric acid, produced from 70 parts of sulphuric acid and 8 parts of dry sodium nitrite, are stirred at room temperature until the diazotisation is complete. The diazotisation mixture is poured into 200 parts of water to which ice has been added in order to keep the temperature at 0°, and the solution is neutralised, whil stirring well, with 30% caustic soda lye until even after 5 minutes there is a weakly alkaline reaction to brilliant yellow paper. The temperature is kept at 0° by the addition of ice. 5-Methylsulphonylbenzene-2.1-diazoxide partly separates as a brownish-yellow precipitate from the yellow solution. It is used in this form for the production of dyestuffs.

*Example 2*

23 parts of 3-nitro-4-aminobenzene-1-ethyl-sulphone are diazotised as described in Example 1 and poured on to 200 parts of ice and 200 parts of water. The greater parts of the diazonium compound crystallises out. The suspension is poured into an ice cold solution of 75 parts of anhydrous sodium carbonate in 800 parts of water and during the addition the temperature is kept at 0° by the addition of ice. The 5-ethylsulphonylbenzene-2.1-diazoxide which is formed almost immediately is used direct for the coupling with azo components.

3-nitro-4-aminobenzene-1-propyl sulphone, 3-nitro-4-aminobenzene-1-chloromethyl sulphone and 3-nitro-4-aminobenzene-1-vinyl sulphone can be diazotised and converted into the corresponding diazoxides in an analogous manner.

*Example 3*

27.8 parts of 3-nitro-4-aminodiphenyl sulphone are diazotised as described in example 1 and poured onto ice. Caustic soda lye is added while stirring at 0° until there is a permanent alkaline reaction to brilliant yellow paper. The yellow diphenyl sulphone-4.3-diazoxide almost completely precipitates and can be filtered off.

*Example 4*

35.8 parts of 3-nitro-4-aminodiphenyl sulphone-3'-sulphonic acid are diazotised as described in Example 1 and the mixture is poured onto 200 parts of ice. Caustic soda lye is added at 0° until the solution has a permanent weakly alkaline reaction to brilliant yellow and the test for dyestuff formation with 2-hydroxynaphthalene-6.8-disulphonic acid shows that the original diazonium compound has disappeared. The temperature is kept at 0°. The brownish-yellow solution of the sodium salt of 4.3-diazoxide-diphenyl sulphone-3'-sulphonic acid can be used direct for the production of dyestuffs.

The 4.3-diazoxide-4'-methyldiphenyl sulphone-3'-sulphonic acid or the sodium salt thereof can be produced in an analogous manner from 37.2 parts of 3-nitro-4-amino-4'-methyldiphenyl sulphone-3'-sulphonic acid.

What we claim is:

1. Process for the manufacture of an aromatic o-hydroxy diazonium compound comprising neutralising the sulphuric acid solution of a diazonium compound of the general formula:

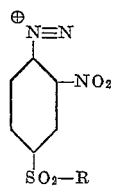

wherein R represents a member selected from the group consisting of lower aliphatic radicals and aromatic radicals of the benzene series, by contacting it with an alkaline reagent up to a pH of 6–11, whereby the nitro group is replaced by the hydroxyl group.

2. The method according to claim 1 in which the sulphuric acid solution of the diazonium compound is slowly added to a solution of an alkali salt of carbonic acid at a temperature of 0–10° C.

3. Process for the manufacture of an aromatic o-hydroxy diazonium compound comprising neutralising the sulphuric acid solution of a diazonium compound of the general formula:

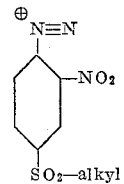

by contacting it with an alkaline reagent up to a pH of 6–11, whereby the nitro group is replaced by the hydroxyl group, "alkyl" signifying an alkyl group containing 1 to 3 carbon atoms.

4. Process for the manufacture of an aromatic o-hydroxy diazonium compound comprising neutralising the sulphuric acid solution of a diazonium compound of the formula:

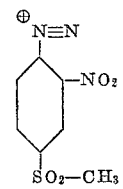

by contacting it with an alkaline reagent up to a pH of 6–11, whereby the nitro group is replaced by the hydroxyl group.

5. Process for the manufacture of an aromatic o-hydroxy diazonium compound comprising neutralising the sulphuric acid solution of a diazonium compound of the formula:

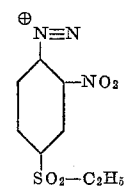

by contacting it with an alkaline reagent up to a pH of 6–11, whereby the nitro group is replaced by the hydroxyl group.

6. Process for the manufacture of an aromatic o-hydroxy diazonium compound comprising neutralising the sulphuric acid solution of a diazonium compound of the formula:

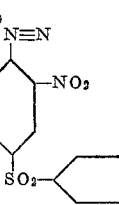

by contacting it with an alkaline reagent up to a pH of 6–11, whereby the nitro group is replaced by the hydroxyl group.

7. Process for the manufacture of an aromatic o-hydroxy diazonium compound comprising neutralising the sulphuric acid solution of a diazonium compound of the formula:

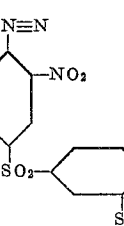

by contacting it with an alkaline reagent up to a pH of

6–11, whereby the nitro group is replaced by the hydroxyl group.

References Cited in the file of this patent

UNITED STATES PATENTS

| | | |
|---|---|---|
| 1,905,354 | Sack | Apr. 25, 1933 |
| 2,551,056 | Schetty | May 1, 1951 |

OTHER REFERENCES

Morgan: Journal Chem. Soc. (London), vol. 107 (1915), pages 645, 650.

Saunders: The Aromatic Diazo Compounds, 2nd ed., 1949, pages 30, 117, 121, 122.